United States Patent
Wayama et al.

(10) Patent No.: US 7,093,581 B2
(45) Date of Patent: *Aug. 22, 2006

(54) THROTTLE VALVE CONTROL APPARATUS OF INTERNAL COMBUSTION ENGINE AND AUTOMOBILE USING THE SAME

(75) Inventors: Eisuke Wayama, Tokyo (JP); Toshifumi Usui, Tokyo (JP); Yoshikatsu Hashimoto, Tokyo (JP); Shigeru Tokumoto, Tokyo (JP); Yasuo Saito, Tokyo (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/762,328

(22) Filed: Jan. 23, 2004

(65) Prior Publication Data

US 2004/0154589 A1    Aug. 12, 2004

Related U.S. Application Data

(63) Continuation of application No. 09/794,209, filed on Feb. 28, 2001, now Pat. No. 6,701,892.

(30) Foreign Application Priority Data

Apr. 6, 2000    (JP)    ............................ 2000-110540

(51) Int. Cl.
    *F02D 1/00*    (2006.01)
(52) U.S. Cl. ...................................... 123/399; 123/361

(58) Field of Classification Search ................ 123/399, 123/361; 73/118.1, 116
See application file for complete search history.

(56) References Cited

U.S. PATENT DOCUMENTS

| 4,392,375 | A | 7/1983 | Eguchi et al. |
| 5,528,139 | A | 6/1996 | Oudet et al. |
| 5,672,818 | A | 9/1997 | Schaefer et al. |
| 6,092,506 | A | 7/2000 | Takagi et al. |
| 6,364,284 | B1 * | 4/2002 | Imada et al. ................ 251/248 |
| 6,400,141 | B1 | 6/2002 | Apel et al. |
| 6,448,762 | B1 | 9/2002 | Kono et al. |

FOREIGN PATENT DOCUMENTS

| DE | 19547408 | 7/1997 |
| DE | 299 01 516 U1 | 1/1999 |
| DE | 19903490 | 8/2000 |
| EP | 1024267 | 8/2000 |
| EP | 1028239 | 8/2000 |
| JP | 9-32588 | 2/1997 |
| JP | 10131771 | 5/1998 |
| JP | 2845884 | 10/1998 |
| JP | 11-211410 | 8/1999 |

* cited by examiner

*Primary Examiner*—John T. Kwon
(74) *Attorney, Agent, or Firm*—Crowell & Moring LLP

(57) ABSTRACT

The invention provides a throttle valve control apparatus provided with a throttle sensor which is in trouble at a low possibility and has a long service life, whereby an accurate output of a throttle opening degree can be obtained. The throttle valve control apparatus of an internal combustion engine has a throttle opening degree sensor constituted by a non-contact sensor using hall elements.

11 Claims, 7 Drawing Sheets

THROTTLE VALVE CONTROL APPARATUS OF INTERNAL COMBUSTION ENGINE AND AUTOMOBILE USING THE SAME

BACKGROUND OF THE INVENTION

1. Field of the Invention

The present invention relates to a throttle valve control apparatus for controlling a flow amount of intake air of an internal combustion engine and a motor vehicle.

2. Description of the Prior Art

An electrical control type throttle apparatus opening and closing a throttle valve of an internal combustion engine by a motor-driven actuator (for example, a direct current motor, a stepping motor, a torque motor and a brushless motor) is put into practice.

The electrical control type throttle apparatus is structured such as to control an optimum throttle valve angle (throttle valve opening degree) corresponding to an engine state on the basis of an opening degree signal of an accelerator pedal and a traction control signal. For this purpose, a sensor for detecting an angle of the throttle valve, so-called a throttle sensor (which may be sometimes called as an opening degree meter or a throttle position sensor) is attached to a throttle body.

A potentiometer system is generally employed in the throttle sensor, and a brush (a sliding element) rotating together with a throttle valve shaft slides on a resisting body, thereby outputting a potential difference signal (a sensor detecting signal) corresponding to a throttle valve opening degree (for example, refer to Japanese Unexamined Patent Publication No. 9-32588).

This kind of conventionally used throttle sensor is structured such that the brush is in contact with a variable resistance and a conductor formed on a resistance base plate so as to slide thereon. Accordingly, a service life of the sensor is short and the sensor is frequently in trouble. A double route of sensor is employed so as to detect a trouble of sensor and mutually back up, however, this can not basically solve the problem.

Further, since the trouble mentioned above is generated in the conventional motor vehicle at a high possibility, and a control parameter is controlled by an output of the sensor having a short service life, an accuracy for operating and controlling the internal combustion engine is low.

There has been known Japanese Patent No. 2845884 as a structure for detecting the opening degree of the throttle valve in a non-contact manner.

SUMMARY OF THE INVENTION

An object of the present invention is to provide a throttle valve control apparatus provided with a throttle sensor which is in trouble at a low possibility and has a long service life.

In particular, there is suggested some structures for compactly attaching a non-contact type sensor to a throttle control apparatus so as to constitute a part of the apparatus.

Further, there is suggested structures for removing a magnetic noise and a bad influence against a magnetic characteristic.

Further, another object is to improve a throttle sensor corresponding to one of elements for controlling control parameters of an internal combustion engine so as to improve an operation control accuracy of the internal combustion engine.

In order to achieve the objects mentioned above, the present invention proposes the following throttle valve control apparatuses and motor vehicles.

In accordance with a first aspect of the present invention, there is provided a throttle valve control apparatus of an internal combustion engine comprising:

a throttle valve shaft or, as hereinafter also referred to, valve throttle axis rotated by a motor-driven actuator;

an alternate magnet mounted to the throttle valve axis;

a cover to which an element for detecting a change of magnetic flux of the alternate magnet is mounted;

the cover being mounted to a throttle body to which the motor-driven actuator is mounted; and an output of the element constituting a function of an opening degree of the throttle valve.

In accordance with a second aspect of the present invention, there is provided a throttle valve control apparatus of an internal combustion engine comprising:

a throttle body provided with a throttle valve controlling an amount of intake air;

a throttle sensor detecting a rotational angle of an axis to which the throttle valve is mounted; and a motor-driven actuator in which a command value is adjusted in accordance with an electric signal output from the throttle sensor, wherein the throttle sensor comprises:

an element mounted to one end of the throttle valve axis; and another element attached to a cover member fixed to the throttle body so as to cover the axial end portion, and wherein a magnetic physical amount between the pair of elements is varied in accordance with a change of the rotational angle of the throttle axis, and the element mounted to the cover member outputs an electric signal relating to the rotational angle of the axis in response to the change of the magnetic physical amount.

In accordance with a third aspect of the present invention, there is provided a motor vehicle comprising:

an element outputting an electric signal relating to an opening degree of a throttle valve on the basis of a magnetic signal of a magnet mounted to an axial end of the throttle valve, wherein a control parameter of an engine is adjusted in accordance with a change of the electric signal output from the element.

In accordance with a fourth aspect of the present invention, there is provided a throttle control apparatus of an internal combustion engine structured such as to transmit a rotation of a motor to a throttle valve axis via a gear fixed to the throttle valve axis, wherein a rotational angle of the throttle valve axis is detected by a magnetic type throttle sensor comprising a magnet and a hall element, and the gear is formed by a resin material.

In accordance with a fifth aspect of the present invention, there is provided a throttle valve control apparatus of an internal combustion engine structured such that a rotary axis of a motor and a throttle valve axis are arranged in parallel and a rotation of the rotary axis of the motor is transmitted to the throttle valve axis via a reduction gear, wherein a magnetic type throttle sensor comprising a magnet and a hall element is mounted so as to be capable of detecting a rotational angle of the throttle valve axis, and wherein a rotary axis of a gear positioned in a middle of a torque transmission path between the rotary axis of the motor and the throttle valve axis is formed by a magnetic material.

In accordance with a sixth aspect of the present invention, there is provided a throttle valve control apparatus of an internal combustion engine structured such as to detect a rotational angle of a throttle valve driven by a motor, wherein a magnet is mounted to the throttle valve axis;

wherein hall elements are arranged at positions facing to each other with respect to the magnet and a stator corresponding to a magnetic path is attached between the hall elements, and wherein the motor is mounted to a position a uniform distance apart from the both hall elements.

In accordance with a seventh aspect of the present invention, there is provided a throttle valve control apparatus of an internal combustion engine structured such that a sensor for detecting a rotational angle of a throttle valve driven by a motor is provided and a rotary axis of the motor and the throttle valve axis are arranged in parallel, wherein a magnet is mounted to the throttle valve axis, wherein hall elements are arranged at positions facing to each other with respect to the magnet and a stator corresponding to a magnetic path is attached between the hall elements, and p1 wherein the both hall elements are arranged out of a circular arc having a radius corresponding to a distance between the rotary axis of the motor and a center of the throttle valve axis.

In accordance with an eighth aspect of the present invention, there is provided a throttle valve control apparatus of an internal combustion engine comprising:

a magnet mounted to a throttle valve axis to which a throttle valve is mounted; and a cover fixed to a throttle body so as to cover the magnet portion, wherein a hall element sensitive to a change of a magnetic physical amount of the magnet and a signal processing circuit converting an output of the hall element into a predetermined electric signal are mounted to the cover.

In accordance with a ninth aspect of the present invention, there is provided a throttle valve control apparatus of an internal combustion engine structured such that a rotary axis of a motor and a throttle valve axis are arranged in parallel and a rotation of the rotary axis of the motor is transmitted to the throttle valve axis via a reduction gear, wherein a cover is mounted to a throttle body so as to cover the reduction gear, and wherein a magnetic type throttle sensor comprising a magnet and a hall element is mounted between an end surface of a gear fixed to the throttle valve axis and the cover so as to be capable of detecting a rotational angle of the throttle valve axis.

In accordance with a tenth aspect of the present invention, there is provided a throttle valve control apparatus of an internal combustion engine comprising:

a magnet mounted to an end portion of a throttle valve axis rotated by a motor;

an element detecting a rotational angle of the throttle valve axis in cooperation with the magnet; and a spring holding the magnet at a predetermined opening position of opening degree when energizing of the motor is shut out, the spring being attached to a periphery of the throttle valve axis.

In accordance with an eleventh aspect of the present invention, there is provided a throttle valve control apparatus comprising:

a magnet mounted to a throttle valve axis rotated by a motor;

an element detecting a rotational angle of the throttle valve axis in cooperation with the magnet; and the element being constituted by two components arranged under a magnetic influence of the magnet so as to be backed up by each other.

DESCRIPTION OF THE PREFERRED EMBODIMENTS

A description will be given below of an embodiment in accordance with the present invention with reference to the accompanying drawings.

Figure 1:
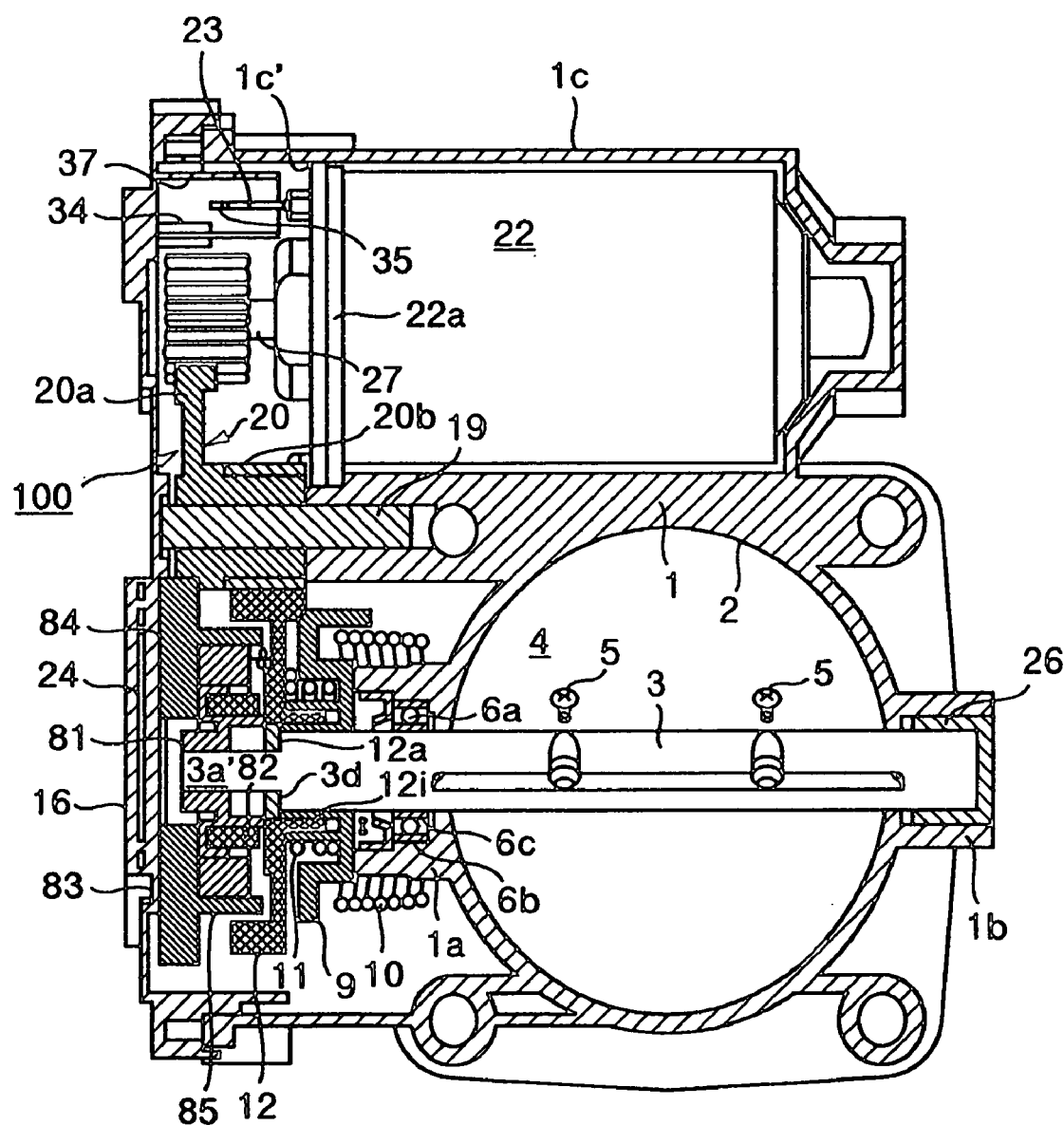
FIG. 1 is a cross sectional view of a throttle valve control apparatus in accordance with an embodiment of the present invention.
Figure 2:
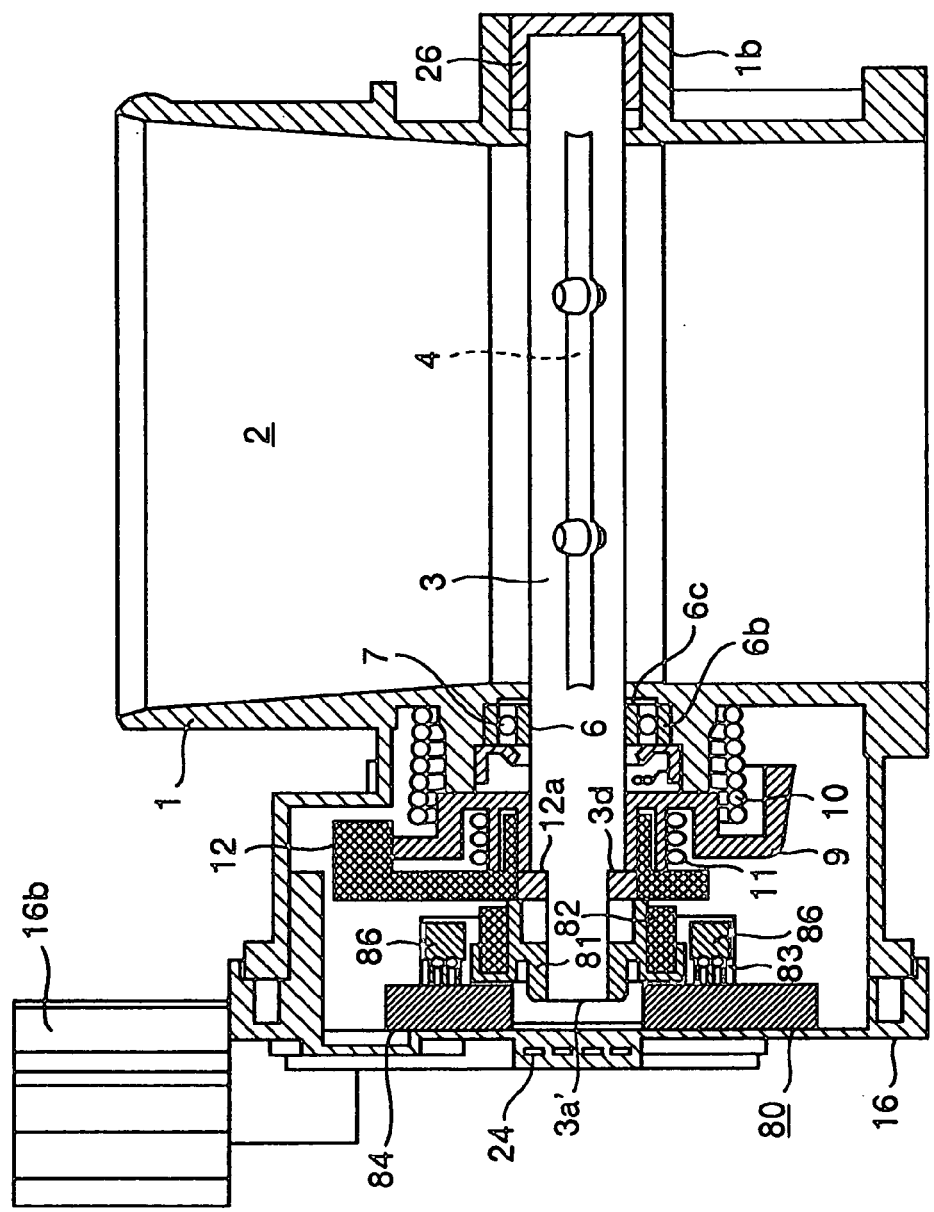
FIG. 2 is another cross sectional view of a throttle valve control apparatus in accordance with an embodiment of the present invention.

As shown in FIG. 1, an electronic control type throttle valve apparatus (a throttle valve apparatus) is mainly constituted by a throttle body (hereinafter, which may be simply called as a body) 1, a throttle valve 4, a motor (a throttle valve drive apparatus; a motor-driven actuator) 22 for driving the throttle valve 4, a reduction gear mechanism 100, a sensor (a throttle sensor) 80 measuring an opening angle (an opening degree) of the throttle valve 4, that is, a rotational angle of the throttle valve axis 3, and a cover 16 protecting the throttle valve axis 3, the motor 22 and the reduction gear mechanism 100.

The body 1 is constituted by integrally forming a receiving portion (an intake bore) 2 of the throttle valve 4 and a receiving portion (a motor housing) 1c of the motor 22.

The throttle valve 4 is mounted to the throttle valve axis 3 by means of a screw 5, and the axis 3 is supported by bearings 6 and 26 provided in the body 1.

In accordance with the present embodiment, the bearing 6 is formed as a ball bearing, and the bearing 26 is formed as a cap-shaped plane bearing. The reason and details thereof will be described later. The ball bearing 6 is attached to a bearing boss 1a via a seal ring 8. Further, an inner ring 6a of the ball bearing 6 is pressure inserted to an outer periphery of the throttle valve axis 3, and an outer ring 6b is transition fitted to an inner periphery of the bearing boss 1a.

In the throttle valve axis 3, only one end protrudes out of a side wall of the body 1. Then, a spring 10, a lever 9, a spring 11 and a final stage gear (a driven gear) 12 of the reduction gear mechanism 100 are attached to one end of the throttle valve axis protruding out of the side wall.

Throttle valve relating parts (hereinafter, called as a throttle valve mechanism) such as the throttle valve axis 3, the reduction gear mechanism 100, the motor 22 and the like are received in a receiving portion (a case) 1d formed on a side wall of the body 1, and the receiving portion 1d is covered by a synthetic resin cover 16. The plane bearing 26 is attached in accordance with a pressure insertion.

Figure 3:
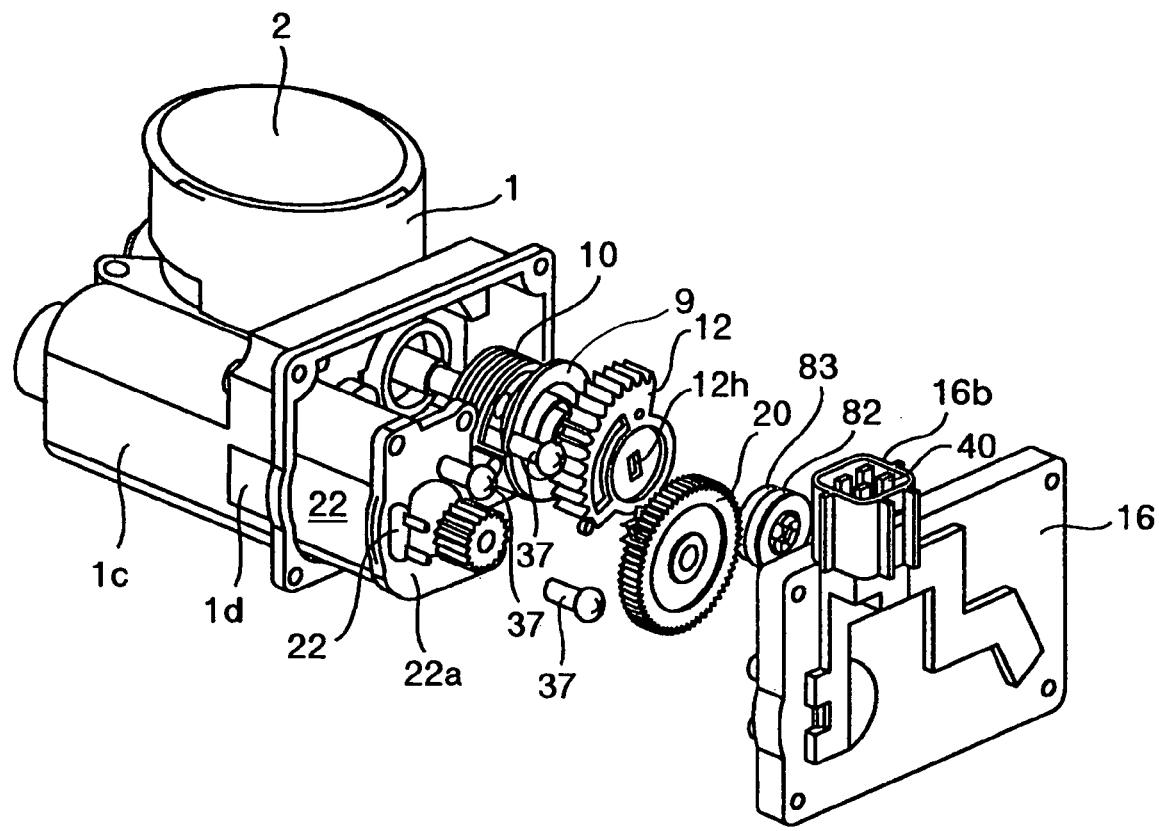
FIG. 3 is an exploded perspective view of a throttle valve control apparatus in accordance with an embodiment of the present invention.
Figure 4:
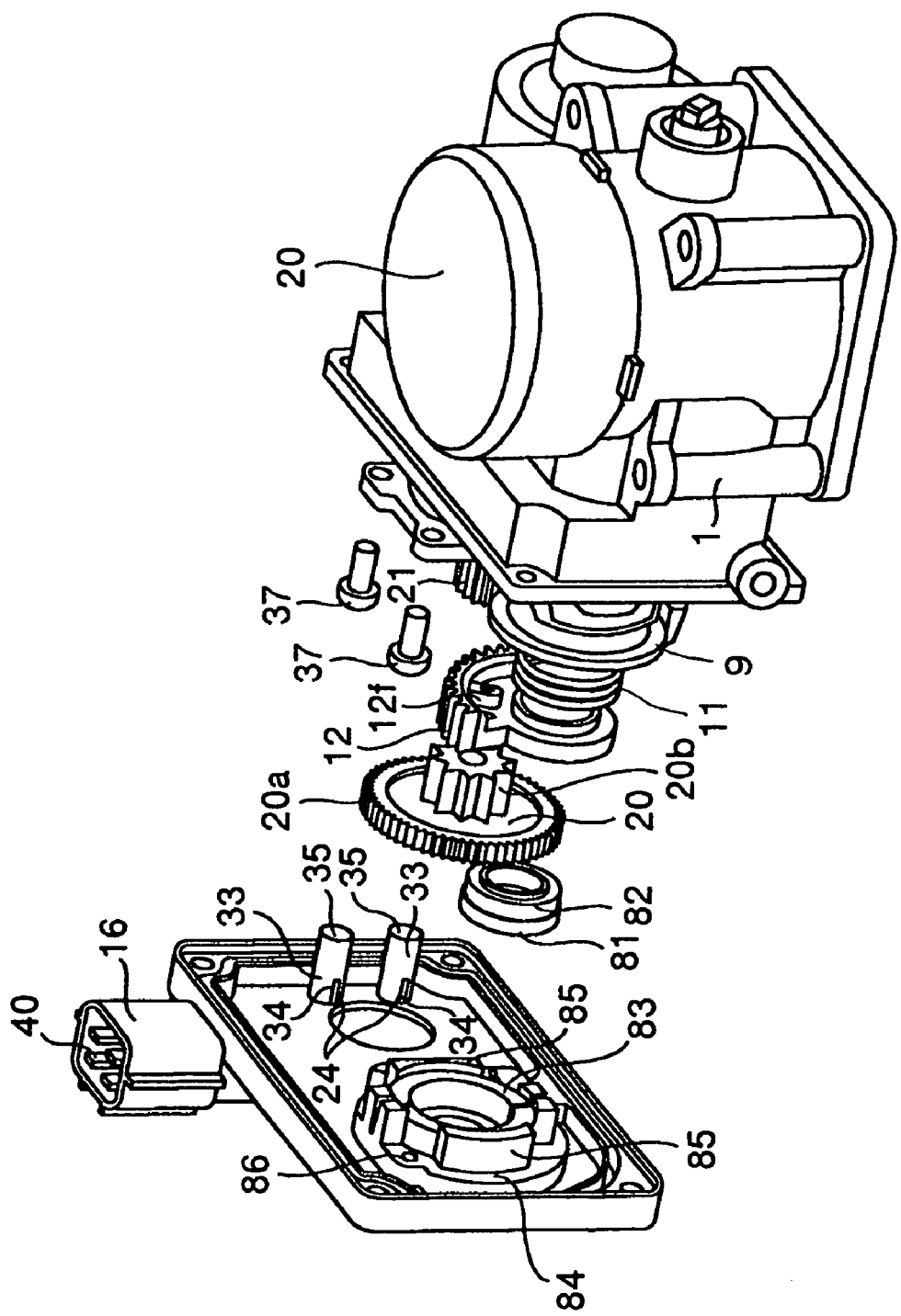
FIG. 4 is an exploded perspective view of a throttle valve control apparatus in accordance with an embodiment of the present invention as seen from another angle.

That is, the throttle valve mechanism is arranged so as to be protected by one cover 16, an opening (an opening for mounting the motor) 1c' of a motor housing 1c is positioned so as to face within the receiving portion 1d, the motor 22 is received in the housing through the opening, and an end bracket 22a of the motor is fixed in the periphery of the opening 1c' by a screw 37 (refer to FIGS. 3 and 4).

A motor terminal 23 provided in the end bracket 22a is positioned near one line of the side wall in the receiving portion 1d, is arranged so as to be directed to the cover 16 side, and is connected to a relay terminal 24a provided in the cover 16 side via a relay connector 33. The relay connector 33 can employ various kinds of aspect. In the present embodiment, a sleeve made of a conductive material is used as the relay connector 33, slits 34 and 35 having shifted directions at 90 degrees are provided in both ends thereof, and the relay terminal 24a and the motor terminal 23 are inserted to the slit. The terminals 24a and 23 also have shifted directions at 90 degrees in correspondence to the directions of the slits 34 and 35.

The motor 22 is driven in response to an acceleration signal relating to a pedaling amount of an acceleration pedal, a traction signal, a uniform speed traveling signal, and an idle speed control signal, and a power of the motor 22 is transmitted to the throttle valve axis 3 via the reduction gear mechanism 100 (the motor pinion 21, middle gears 20 and the final stage gear 12). The pinion 21 is mounted to a motor shaft 27, and the middle gears 20 are freely fitted to a conductive shaft 19 adhered to the throttle body 1. A gear 20a having a larger diameter among the middle gears 20 is engaged with the pinion 21 and a gear 20b having a smaller diameter is engaged with the gear 12.

The final stage gear 12 is a fan-shaped gear as shown in FIGS. 3 and 4.

A description will be given of a relation between the gear 12 and the lever 9. The gear 12 has a hole 12h for passing one end of the throttle valve axis 3 therethrough as shown in FIG. 3, the hole 12h is formed in a shape capable of engaging with one end 3a (having at least two flat surfaces) of the throttle valve axis and is integrally rotated with the throttle valve axis.

The lever 9 is freely fitted to an outer periphery (a circumferential surface) of the throttle valve axis 3, however, is engaged so as to be together attracted to the gear via the spring 11. For example, a projection denotes by reference symbol 12f in FIG. 4 is engaged with a projection (not shown) of the lever 9. The projection 12f is formed inside the gear 12.

The spring 10 corresponds to a return spring for the throttle valve, one end thereof is engaged with a spring engaging portion (not shown) provided in the body 1, and another end thereof is engaged with the lever 9.

The spring 10 applies a return force to the throttle valve axis via the lever 9 and the gear 12, and further, constitutes a so-called default opening degree setting mechanism which has been already known, in cooperation with the spring 11 and the lever 9.

The default opening degree setting mechanism is structured such as to keep an initial opening degree of the throttle valve 4 at a time of turning off an engine key (in other words, at a time when the motor-driven actuator 22 is not energized) to a predetermined opening degree larger than a full close position.

Between the default opening degree position to a full open control position, the throttle valve opening degree is determined in correspondence with a balance between a torque of the motor 22 and a valve closing force of the spring (the return spring) 10.

In the case of controlling so as to make the throttle valve opening degree smaller than the default opening degree, a motion of the lever 9 is restricted by a default opening degree stopper (not shown) and the control operation is performed by rotating only the gear 12 and the throttle valve axis 3 in a full closing direction against the force of the spring 11.

A movable side stopper 12d provided in one line of the fan-shaped gear 12 is brought into contact with a full close stopper (not shown) for restricting a mechanical full close position of the throttle valve, whereby a full close position is determined.

With respect to a material of the gear 12 in accordance with the present embodiment, a center portion thereof is formed by a metal plate 12a, and a portion 12b forming teeth and the other portions are integrally formed by a synthetic resin (a reinforced plastic).

In this case, the metal plate 12a is insert molded to the resin portion of the gear 12.

A side end of the gear 12 of the magnet 82 faces to the resin portion of the gear.

Accordingly, it is possible to prevent a magnetic flux of the magnet 82 from being leaked to the gear 12.

The metal plate 12a in a center portion of the gear 12 is pressed to the throttle body 1a side by a magnet holder 81, however, since the magnet holder 81 itself is made of a resin, the magnetic field is not leaked even if the magnet holder 81 is in contact with the metal plate 12a.

The movable side stopper 12d formed in one of cut end surfaces of the gear 12 is integrally connected to the metal plate 12a.

The movable side stopper 12d is made of a metal for the purpose of achieving an abrasion resistance and an impact resistance. That is, mechanical full close position of the throttle valve becomes a reference point on control, and the stopper element 12d is brought into contact with the full close stopper 25 in a fixed side at least one time at every operation starting times or operation finishing times. Accordingly, the movable side stopper 12d is made of a metal so as to resist against a comparatively high collision frequency.

Reference symbol 12i denotes a guide for engaging the gear 12 with the lever 9.

The resin magnet holder 81 is pressure inserted and fixed to the front end of the throttle valve axis 3, and the magnet 82 is integrally attached to the magnet holder 81 in accordance with a molding process.

An end portion of the magnet holder 81 presses the end surface of the gear 12 to a stepped portion 3d side of the throttle shaft 3, and commonly serves to prevent the gear 12 from being taken out.

A circuit board 84 of the throttle sensor 80 is fixed to a position opposing to the end portion of the throttle axis 3 on the inner surface of the cover 16 by a welding pin 86.

A pair of semicircular stators 83 are fixed to the circuit board 84 so as to surround a periphery of the magnet 82 in such a manner as to face to each other with keeping a predetermined interval 87. Reference numeral 85 denotes a guide of the stator 83 integrally provided in the circuit board 84.

Hall elements 86 are mounted to a gap 87 portion between a pair of semicircular stators 83.

Three terminals of the hall elements 86 are mechanically held to the circuit board 84 and are connected to a signal processing circuit such as an amplifier or an analogue/digital converter (not shown) arranged in the circuit board 84.

The signal processing circuit arranged in the circuit board 84 is connected to a conductor 24 integrally molded with the cover 16, and can transmit a signal to an external apparatus via an electric terminal 40 (connected to the conductor 24) of the connector 16b integrally formed with the cover.

The hall element 86 detects a change of the magnetic field and generates a hall voltage when the throttle valve axis 3 rotates and the magnet 82 rotates.

The voltage is transmitted to the external circuit via the conductor 24 and the terminal 40 after being amplified by the amplifier or signal converted (including an amplification) by the analogue/digital converter.

An engine control unit (not shown) of a motor vehicle is provided with a coupler connected to the connector 16b and a signal line, and the signal from the terminal 40 is input to the control unit.

The control unit corrects a fuel and an opening degree of a throttle valve corresponding to the control parameters and controls a speed change point of an automatic transmission, on the basis of a throttle opening degree and a vehicle speed detected in correspondence to a change of magnetic field corresponding to a magnetic physical amount of the magnet 82.

Further, the spring 11 urges the gear 12 in a throttle valve opening direction so as to forcibly open the magnet 82 of the sensor to a predetermined opening degree position, when the energizing of the motor 12 is shut out.

Accordingly, in the motor vehicle provided with the throttle control apparatus in accordance with the present embodiment, the control parameters of the engine are adjusted in correspondence to the change of the electric signal which the hall element 86 outputs in connection with the opening degree of the throttle valve in response to the magnetic signal of the magnet mounted to the axial end of the throttle valve.

Since the sensor is a non-contact type, the opening signal of the throttle valve 4 corresponding to the change of the electric signal which the hall element 86 outputs is not exposed to a secular change so much, so that it is possible to accurately adjust the control parameters of the internal combustion engine for a long period.

Figure 7A:
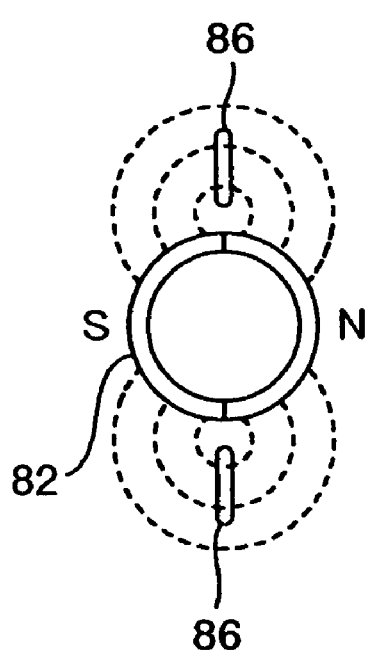
FIGS. 7A and 7B are views for explaining a positional relation between a motion of a magnet and a hall element.
Figure 7B:
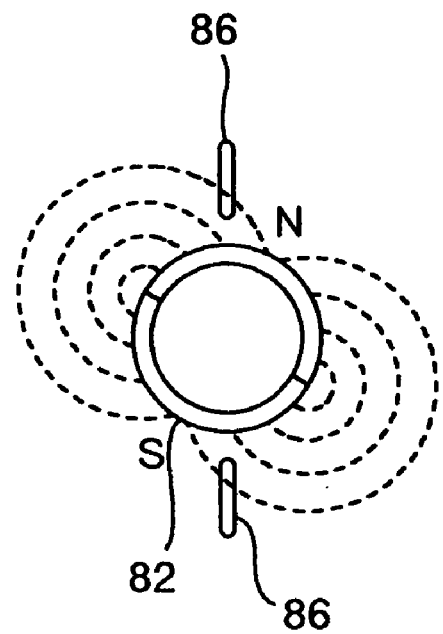

A description will be given of a principle of the sensor with reference to FIG. 7.

The magnet 82 corresponding to a rotor of the throttle sensor 80 is fixed to the magnet holder 81 in a state of facing a pair of arc-shaped magnets mutually having different polarities to each other.

When the magnet holder 81 is fixed to the throttle valve 3 and the throttle valve axis 3 is rotated, bonding surfaces of both of the magnets are relatively rotated with respect to the hole element. FIG. 7 shows a change of a magnetic line of force in this state.

A pair of hall elements 86 placed in the bonding surface portion of the magnetic pole output a signal forming a function of a rotational angle in response to the change of the magnetic line of force generated in correspondence to the change of the rotational angle of the throttle valve axis 3.

Since the gear 12 is made of a synthetic resin, the magnetic field generated by the magnet 82 is not badly influenced by the gear 12.

In the embodiment, the center portion fitted to the throttle valve axis 3 is made of a metal, however, a magnetic bad influence is further reduced by forming all the elements by a synthetic resin.

Since the magnetic field is not shifted even when the shape of the gear 12 is an irregular shape such as a fan shape, a sensitive characteristic of the hall element 86 can be uniformly obtained without relation to an angle of rotation of the throttle axis.

Figure 5:
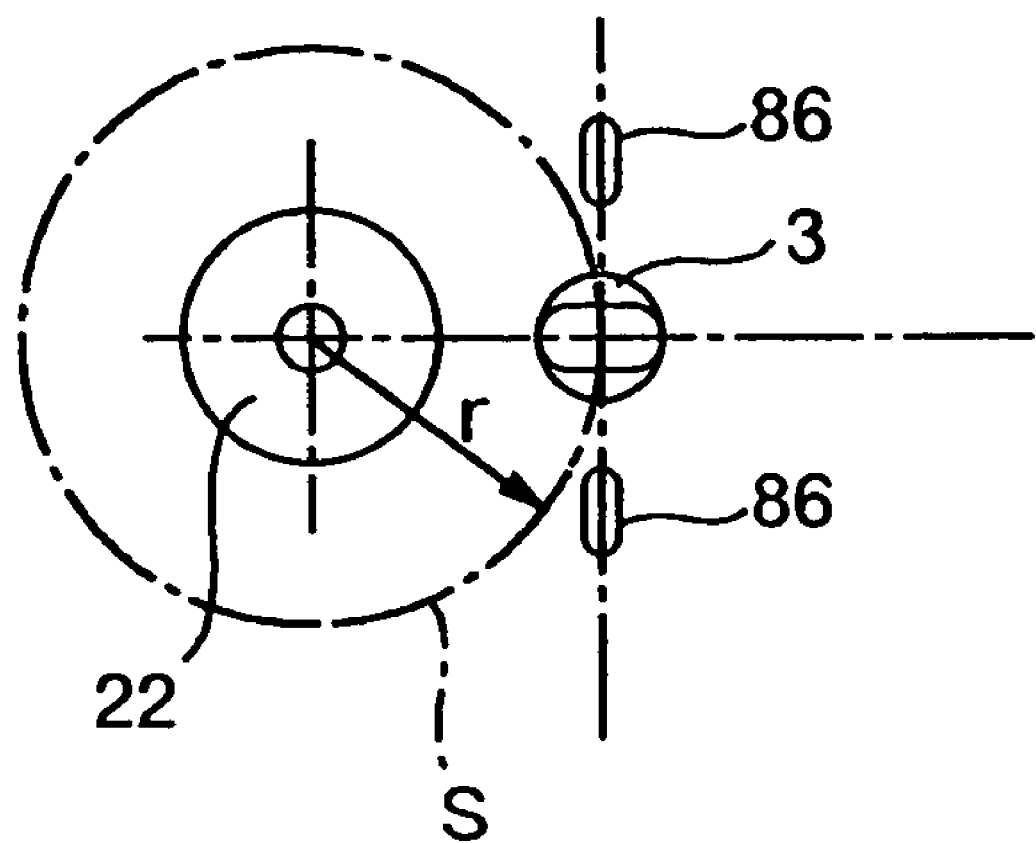
FIG. 5 is a view for explaining a feature of a structure of the embodiment.

As shown in FIG. 5, the hall element 86 is mounted in an outer portion of an area of a circular arc S drawn around a center of rotation of the motor by setting a size between a center of the rotary axis of the motor and a center of rotation of the throttle to a radius.

As a result, the hall element 86 is hard to be affected by an electromagnetic influence caused by a change of a drive current of the motor, and a detecting accuracy of the hall element 86 is hard to be deteriorated.

Since the structure is made such that the stator 83 is mounted to the circuit board 84 so as to be fixed to the inner surface of the cover 16, an assembling operation of the stator 83 can be easily performed.

In this case, it is possible to directly fix the stator to the cover 16.

In this case, the stator is fixed with shifting the control circuit from the stator, however, there is an advantage that a size in an axial direction can be shortened.

Since the rotational support axis 19 of the middle gear 20 positioned between the motor 22 and the magnetic type non-contact sensor 80 is made of a magnetic material, it is possible to expect an effect of shielding an electromagnetic influence caused by the change of the drive current of the motor 22 by the rotational support axis 19, so that the hall element 86 is hard to be affected by the electromagnetic influence of the motor 22, and a detecting accuracy of the hall element 86 is hard to be deteriorated.

Figure 6:
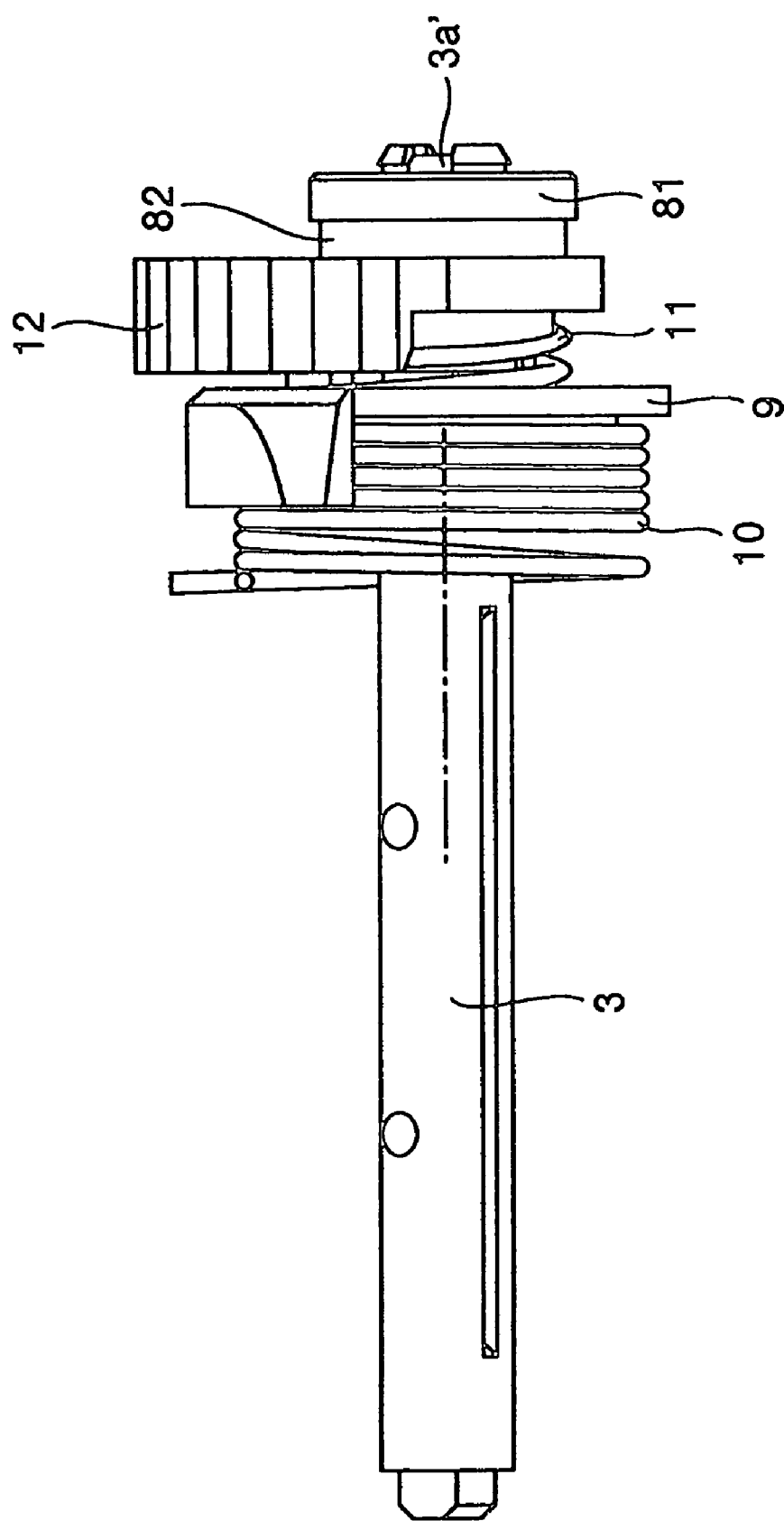
FIG. 6 is a view showing a throttle valve axis assembly.

As shown in FIG. 6, since it is possible to assemble the throttle valve axis 3, the springs 10 and 11, the lever 9, the final stage gear 12, the magnet holder 81 and the magnet 82 to the throttle body 1 as a sub-assembly, an assembling operation can be easily performed.

In accordance with the present invention, it is possible to assemble the non-contact type sensor in the throttle body in a compact manner.

In accordance with another invention, it is possible to arrange the non-contact type throttle sensor between the cover of the throttle body and the gear in a compact manner.

Further, in accordance with the other invention, it is possible to assemble the non-contact type throttle sensor of the electromagnetic system in the throttle body by the structure which is hard to be affected by the electromagnetic noise.

Since it is possible to adjust the control parameters of the engine on the basis of the throttle opening degree signal which has a little secular change, a motor vehicle having a high control accuracy can be obtained.

The invention claimed is:

1. A throttle valve control apparatus of an internal combustion engine structured such as to transmit a rotation of a motor to a throttle valve shaft via a gear fixed to the throttle valve shaft, wherein a rotational angle of said throttle valve shaft is detected by a magnetic type throttle sensor comprising a magnet and a hole element, and said gear is formed by a resin material.

2. A throttle valve control apparatus according to claim 1, further comprising:
a permanent magnet mounted to the throttle valve axis;
a cover to which an element for detecting a change of magnetic flux of said permanent magnet is mounted;
said cover being mounted to a throttle body to which said motor-driven actuator is mounted; and
an output of said element constituting a function of an opening degree of said throttle valve.

3. A throttle valve control apparatus according to claim 1, further comprising:
a throttle body provided with a throttle valve controlling in an amount of intake air; and
a motor-driven actuator in which a command value is adjusted in accordance with an electric signal output from said throttle sensor,
wherein said throttle sensor comprises:
an element mounted to one end of said throttle valve shaft; and
another element attached to a cover member fixed to said throttle body so as to cover the axial end portion, and
wherein a magnetic physical amount between said pair of elements is varied in accordance with the change of the rotational angle of said throttle valve shaft, and the element mounted to said cover member outputs an electric signal relating to the rotational angle of said throttle valve shaft in response to the change of said magnetic physical amount.

4. A throttle valve control apparatus according to claim 1, further comprising:
an element outputting an electric signal relating to an opening degree of a throttle valve on the basis of a magnetic signal of a magnet mounted to an axial end of said throttle valve shaft,
wherein a control parameter of the engine is adjusted in accordance with a change of the electric signal output from said element.

5. A throttle valve control apparatus according to claim 1, wherein a rotary shaft of the motor and the throttle valve shaft are arranged in parallel and a rotation of the rotary shaft of said motor is transmitted to said throttle valve shaft via a reduction gear,
wherein a magnetic type throttle sensor comprising a magnet and a Hall element is mounted so as to be capable of detecting a rotational angle of said throttle valve shaft, and
wherein a shaft for rotation of a gear positioned in a middle of a torque transmission path between the rotary shaft of said motor and said throttle valve shaft is formed by a magnetic material.

6. A throttle valve control apparatus according to claim 1 wherein a magnet is mounted to said throttle valve axis;
wherein Hall elements are arranged at positions facing to each other with respect to the magnet and a stator corresponding to a magnetic path is attached between said Hall elements, and
wherein said motor is mounted to a position a uniform distance apart from said Hall elements.

7. A throttle valve control apparatus according to claim 1, wherein a rotary shaft of said motor and said throttle valve shaft are parallel,
a magnet is mounted to said throttle valve shaft,
Hall elements are arranged at positions facing to each other with respect to the magnet and a stator corresponding to a magnetic path is attached between said Hall elements, and
said Hall elements are arranged out of a circular arc having a radius corresponding to a distance between the rotary shaft of said motor and a center of said throttle valve shaft.

8. A throttle valve control apparatus according to claim 1, wherein
a cover is fixed to a throttle body so as to cover said magnet, and
said Hall element sensitive to a change of a magnetic physical amount of said magnet and a signal processing circuit converting an output of
said Hall element into a predetermined electric signal are mounted to said cover.

9. A throttle valve control apparatus according to claim 1, wherein a rotary axis of said motor and said throttle valve shaft are arranged and a rotation of the rotary shaft of said motor is transmitted to said throttle valve shaft via a reduction gear,
a cover is mounted to a throttle body so as to cover said reduction gear, and
the magnet and Hall element are mounted between an end surface of a gear fixed to said throttle valve shaft and said cover so as to be capable of detecting a rotational angle of said throttle valve shaft.

10. A throttle valve control apparatus according to claim 1, wherein
a spring is arranged to hold said magnet at a predetermined opening position of opening degree when energizing of said motor is shut out, said spring being attached to a periphery of said throttle valve shaft.

11. A throttle valve control apparatus according to claim 1, wherein
an element is provided to detect a rotational angle of said throttle valve axis in cooperation with the magnet,
said element being two components arranged under magnetic influence of said magnet.

* * * * *